Figure 1:
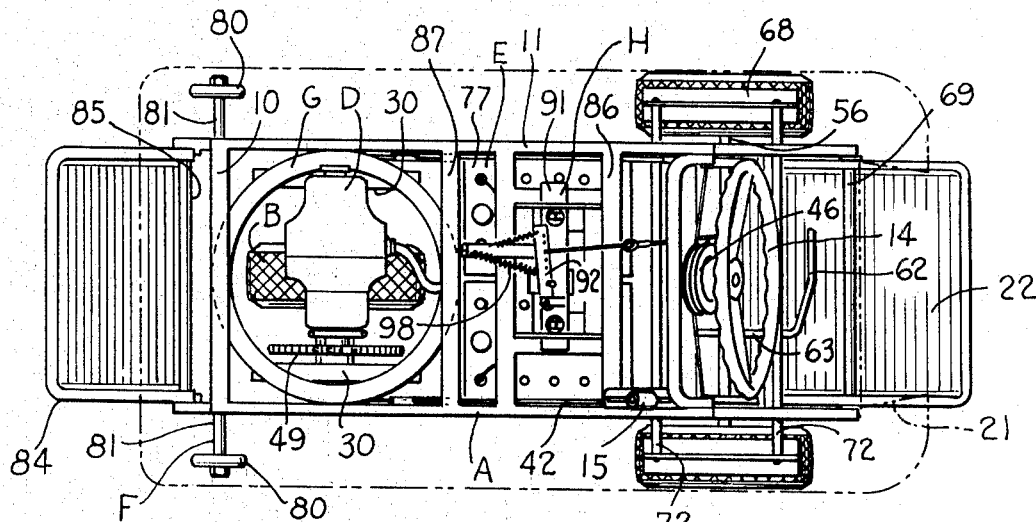

United States Patent

[11] 3,566,985

[72] Inventor James T. Triplett
Shamrock Drive, Chester, S.C. 29706
[21] Appl. No. 727,271
[22] Filed May 7, 1968
[45] Patented Mar. 2, 1971

[54] ELECTRIC VEHICLE
3 Claims, 11 Drawing Figs.

[52] U.S. Cl. ................................................ 180/26,
280/92, 180/52, 180/65, 280/150, 280/80
[51] Int. Cl. ................................................ B62d 9/00
[50] Field of Search ................................................ 180/26
(Cursory), 65, 25, 27, 52; 280/92; 280/150, 80

[56] References Cited
UNITED STATES PATENTS
| | | | |
|---|---|---|---|
| 1,001,837 | 8/1911 | Fuller | 180/52 |
| 1,311,032 | 7/1919 | Arpin | 280/92 |
| 2,767,995 | 10/1956 | Stout | 280/150 |
| 3,193,040 | 7/1965 | Loomis | 180/26X |
| 3,219,137 | 11/1965 | Appleton | 180/26 |
| 3,416,625 | 12/1968 | Narutani | 180/52X |

Primary Examiner—Kenneth H. Betts
Attorney—Bailey & Dority

ABSTRACT: An electric vehicle capable of maneuvering in restricted areas through the use of a single steerable drive wheel mounted on a circular bearing assembly, which has a groove therein for receiving a cable so that by pulling the cable the steering wheel can be rotated. The electric vehicle has outwardly extending stabilizing members mounted on the frame adjacent the steering wheel so as to prevent the vehicle from turning over when such is cut too sharply. The vehicle is driven by an electric motor which is powered by a DC battery having a plurality of cells. A switching circuit is provided for sequentially converting a parallel connection of the cells to a series connection so as to vary the voltage supplied to the motor by simple manipulation of a single handle. The battery is carried within a pack so that such can be removed from the vehicle, and another battery pack substituted therefor, while such is being charged. Positioned adjacent the rear of the vehicle is a pivotal platform upon which the operator stands while driving the vehicle. A braking shoe is coupled to the pivotal platform so that when the operator shifts his weight forward on the platform such engages a wheel, stopping the vehicle. However, if the operator shifts his weight to the rear, the braking shoe will be raised off the wheel permitting the vehicle to move. The position of the rear axle of the vehicle can be readily adjusted by merely manipulating a locking mechanism and shifting the axle to the desired position.

PATENTED MAR 2 1971 3,566,985

SHEET 1 OF 4

INVENTOR.
JAMES T. TRIPLETT
BY
Bailey + Dority
ATTORNEYS.

INVENTOR
JAMES T. TRIPLETT
BY Bailey + Dority
ATTORNEYS.

INVENTOR.
JAMES T. TRIPLETT
BY
Bailey + Dority
ATTORNEYS.

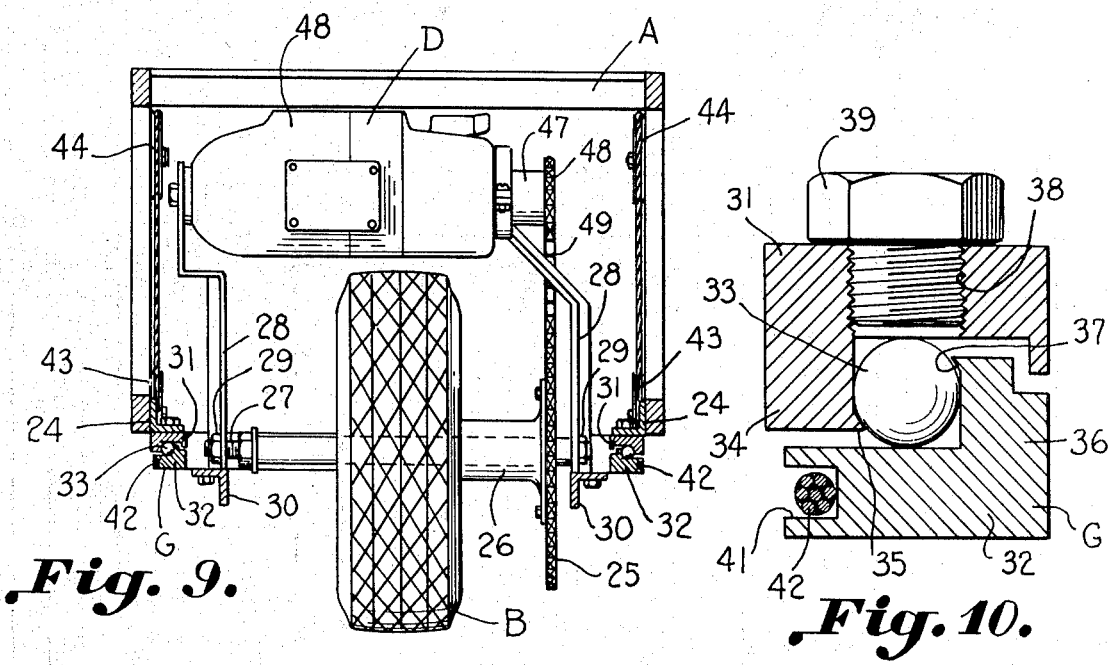
Fig. 9.
Fig. 10.
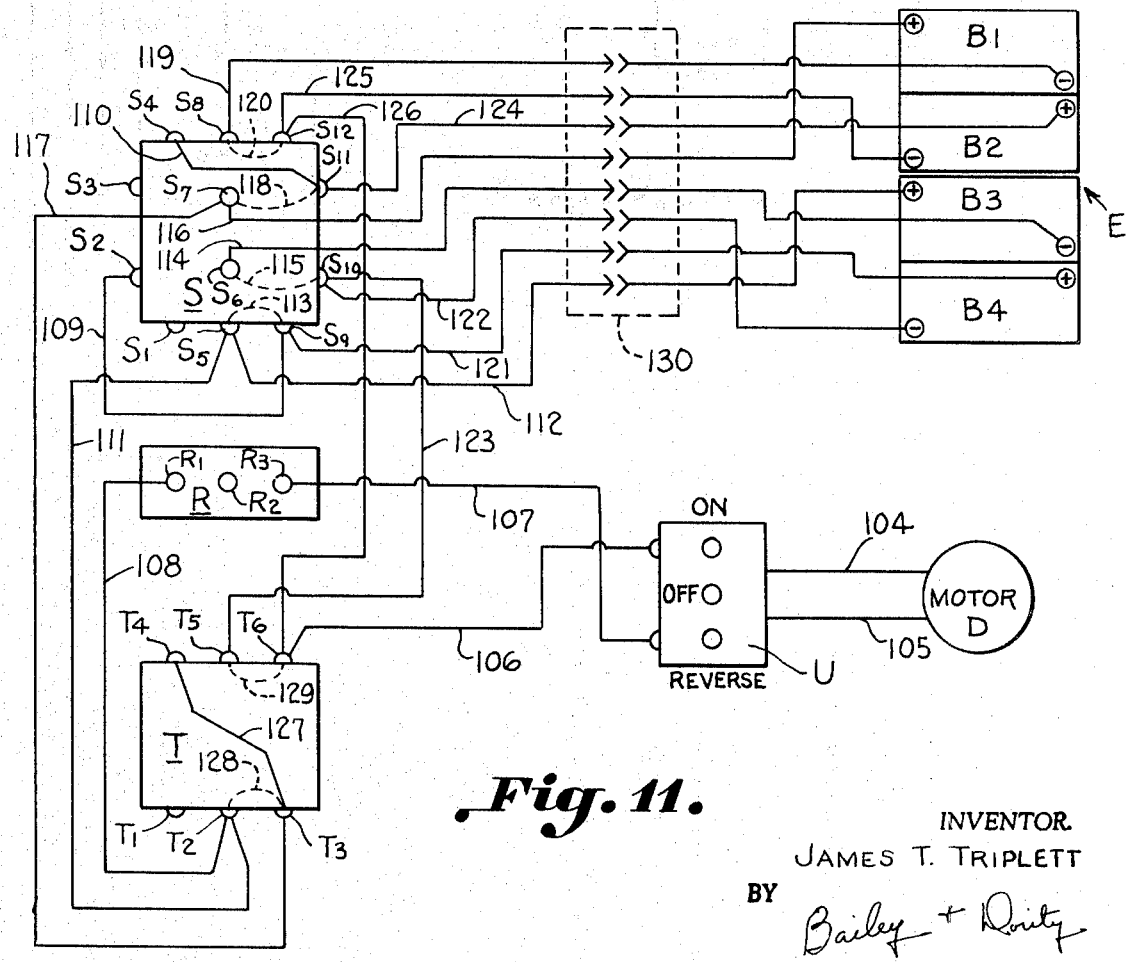
Fig. 11.
INVENTOR.
JAMES T. TRIPLETT
BY
Bailey + Duity
ATTORNEYS.

ELECTRIC VEHICLE

This invention relates to an electric vehicle, and more particularly to an efficient and readily maneuverable electric vehicle.

One of the problems encountered in industrial vehicles is that they are difficult to maneuver in restricted areas, such as in narrow aisles of buildings. In an attempt to minimize the problem three-wheeled vehicles have been developed wherein a single steerable driving wheel issued so as to produce a short turning radius. Such does produce a short turning radius and, thus does increases the maneuverability of the vehicle, however, it also increase the possibility that the vehicle will tilt or turn over when such is turned sharply.

Another problem encountered in electric vehicles, such as golf carts, is overheating when the vehicles is run at slow speeds. Such is frequently due to the variable speed controls which are used, which normally incorporates a variable resistance element for controlling the voltage being supplied to the motor. This type of control not only shortens the charged life of the batteries being used, but also have a substantial heat loss.

Rotary-type switching elements have been utilized in which the voltage supplied to the motor can be increased by sequentially placing a plurality of cells in series. One problem encountered here is that normally the first cell weakens much sooner than the last cell in the chain, producing an uneven discharge rate of the batteries.

It is, also, desirable in electric vehicles, that when an operator steps from the vehicle such should automatically be placed in an arrested condition so as to prevent the vehicle from rolling freely. The electric controls on the vehicle should also be designed so that when the operator removes his hand or the like, therefrom, the vehicle should be stopped.

In order to minimize the above-mentioned problems, one particular electric vehicle constructed in accordance with the present invention has a steerable drive wheel which is mounted adjacent the front of the frame of the vehicle so that the vehicle can be readily maneuvered. Adjacent the rear of the vehicle is a pair of adjustable wheels. A pair of stabilizing members extend laterally from the frame of the vehicle adjacent the front steerable wheels so that if the vehicle tilts during operation, the stabilizing wheel will engage the surface, preventing the vehicle from turning over. Thus, the vehicle is readily maneuverable and can be used in restrictive areas, and is still safe to operate. The vehicle is driven by a DC electric motor which is powered by a DC battery having a plurality of cells. A switching circuitry is provided so that the cells can be sequentially converted from a parallel connection to a series connection to increase the voltage being supplied to the motor, and, thus increase the speed that the vehicle is traveling. By connecting the motor to the battery in such a manner there is substantially no power lost in varying the speed of the vehicle. Another feature of the vehicle which simplifies its construction, is that it is steered by means of manipulating a cable which is wrapped around a portion of a circular ball bearing member upon which the steerable driving wheel is carried. By pulling the cable by turning a steering wheel, the steerable drive wheel may be turned accordingly, for guiding the vehicle. In order to prevent accidental energization of the vehicle a pivotal platform is provided to the rear of the vehicle to which a braking shoe is coupled. When the operator places his weight at the rear of the platform such causes the braking element to move out of engagement with the wheels of the vehicle allowing such to move. When the operator steps off the vehicle a spring causes the platform to pivot so that the braking element is in engagement with the wheel preventing such from moving forward. In order that the vehicle not be tied up while recharging the battery such is carried in a readily removable pack which plugs into the vehicle. An identical pack can be substituted therefor, so that the vehicle is ready for use at all times.

Accordingly, an important object of the present invention is to provide a vehicle which is readily maneuverable in restricted areas, which is relatively safe from turning over, and is simple to operate.

Another important object of the present invention is to provide an electric vehicle which is relatively simple to construct and can be operated with a minimum amount of power loss.

Another important object of the present invention is to provide an industrial vehicle which has controls and a braking mechanism which prevents accidental operation or rolling of the vehicle when not under the control of an operator.

Still another important object of the present invention is to provide a vehicle with wheels, the position of which can be readily adjusted so as to distribute the load on the frame in order to maintain proper traction for the driving wheel.

Still a further important object of the present invention is to provide an electric vehicle as aforesaid, in which the components are of sufficient simplicity to make possible economical fabrication.

A further object of the present invention is to provide an electric vehicle which is strong and sturdy, and will withstand long and rigorous use.

The construction designed to carry out the invention will be hereinafter described, together with other features thereof.

Figure 2:
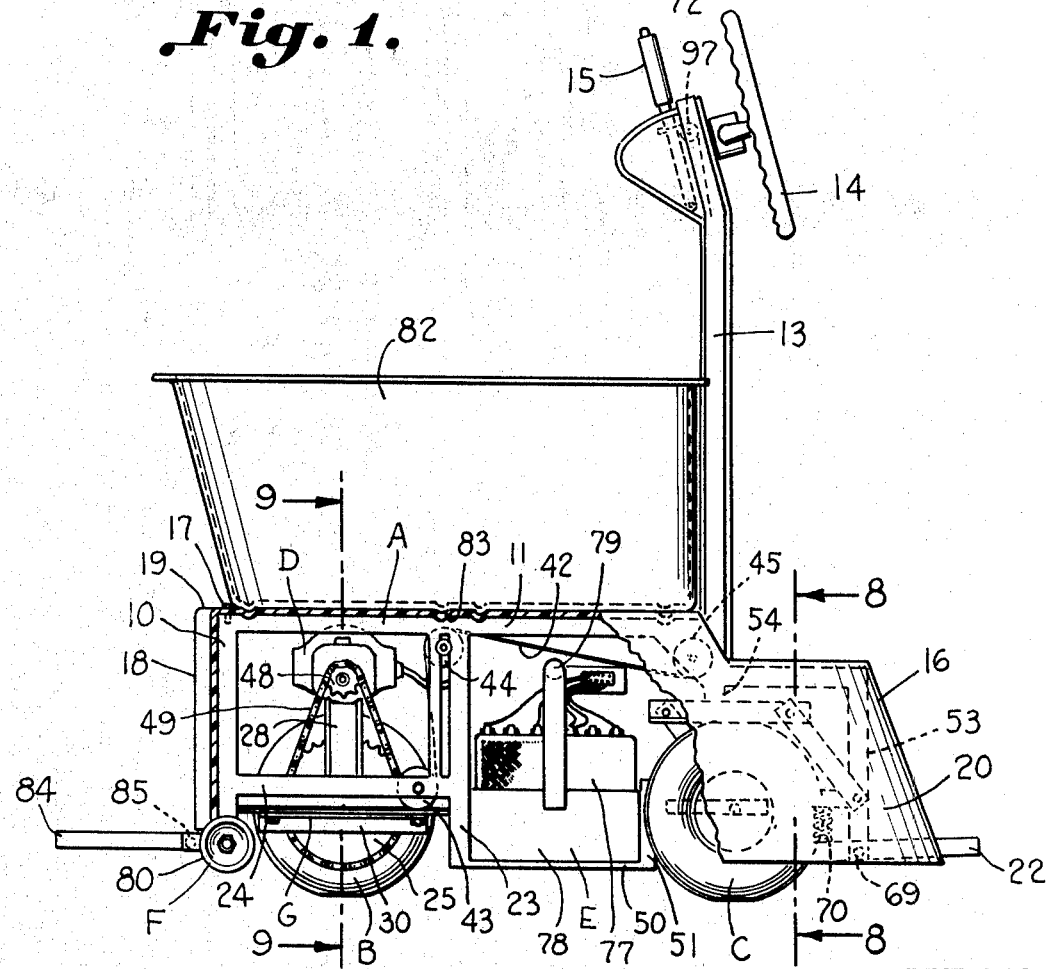
Figure 6:
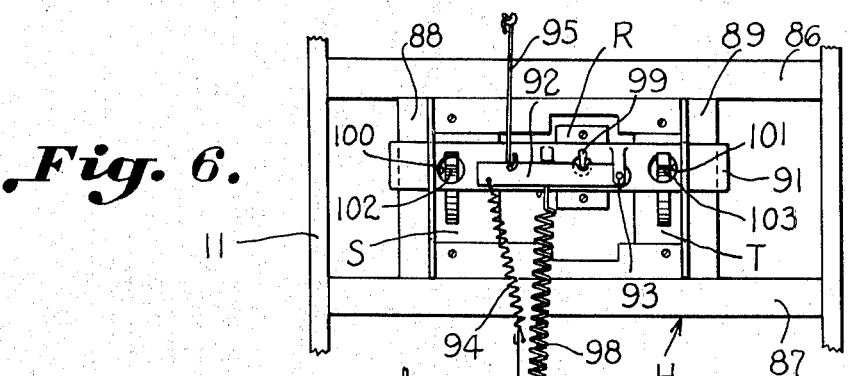
Figure 7:
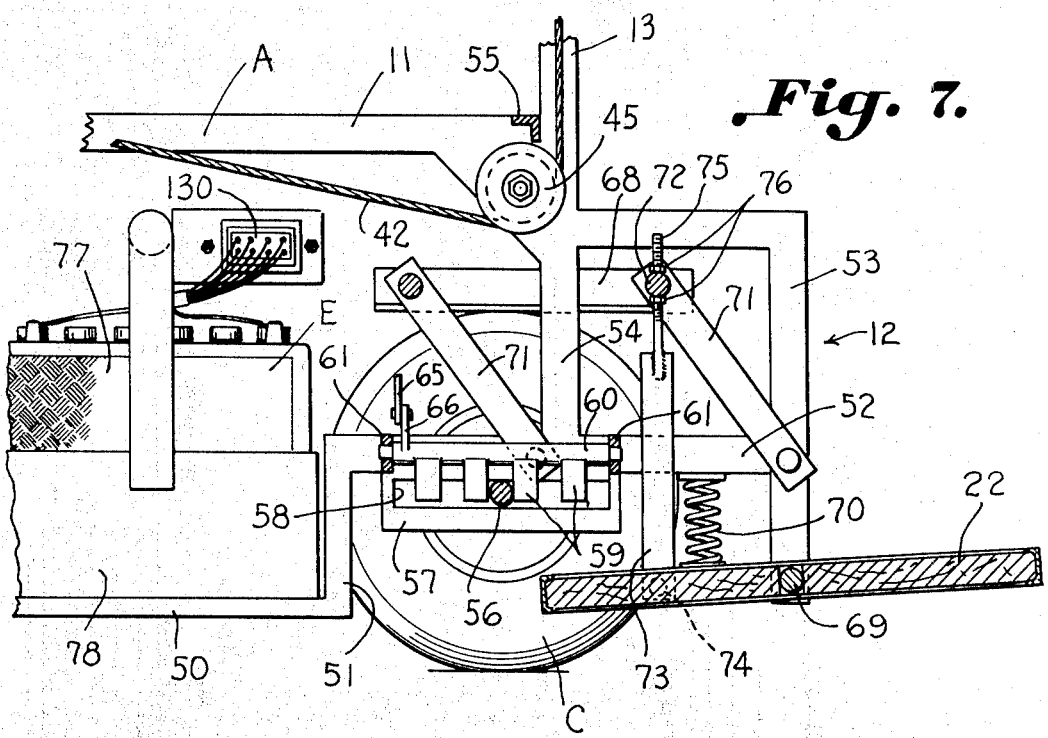
Figure 8:
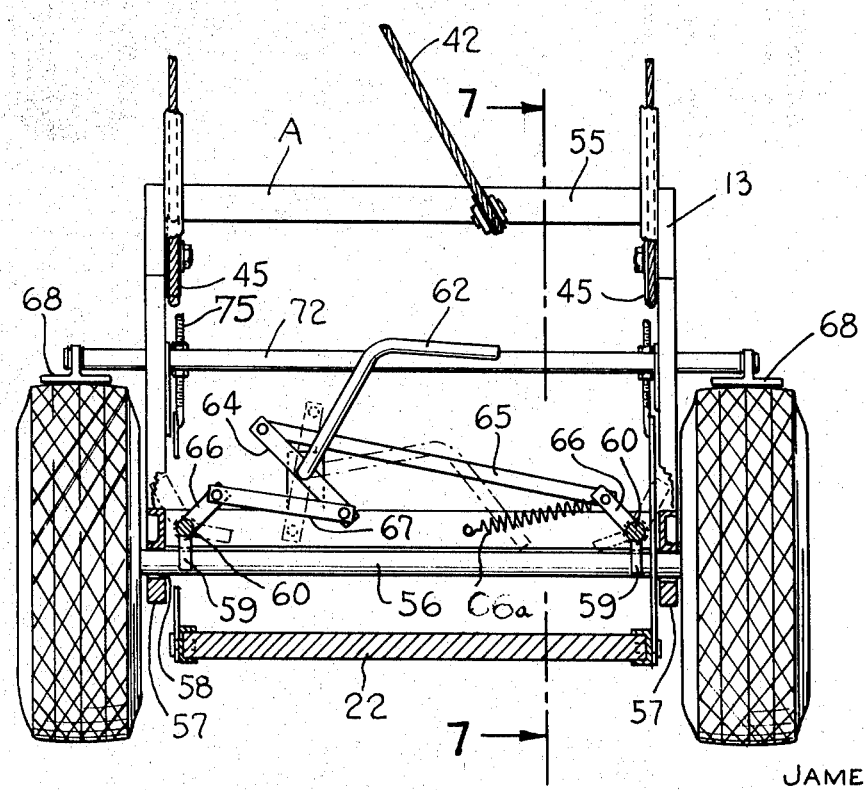

The invention will be more readily understood from a reading of the following specification and by reference to the accompanying drawings forming a part thereof, wherein an example of the invention is shown and wherein:

FIG. 1 is a plan view with the body of the vehicle removed, to illustrate the working mechanism therein, FIG. 2 is a side elevational view, partially in section, FIGS. 3, 4, 5 and 6 are plan views illustrating the switching circuit in various positions for supplying voltage to the electric motor of the vehicle FIG. 7 is an enlarged elevational view illustrating a portion of the battery pack for the vehicle and the rear wheel assembly of such, taken along line 7-7 of FIG. 8, FIG. 8 is a sectional view, taken along line 8-8 of FIG. 2, illustrating the mechanism for shifting the position of the rear wheels, FIG. 9 is a sectional view taken along line 9-9 of FIG. 2, illustrating the drivable steering wheel, FIG. 10 is a sectional view illustrating a portion of the circular bearing member upon which the steerable drive wheel is carried, and FIG. 11 is a schematic diagram illustrating the electrical circuit for said vehicle.

The drawings illustrate a self-propelled electric vehicle capable of riding on surfaces which include a frame A. A single steerable drive wheel B is carried adjacent one end of the frame in engagement with the surface upon which the vehicle is traveling, and supports that particular end of the vehicle. A pair of wheels are carried on the opposite end of the frame from the steering wheel B in engagement with the surface upon which the vehicle is traveling for supporting the opposite end of the vehicle. The vehicle is driven by a DC motor D which is, in turn, powered by a battery E carried by the frames. Laterally extending stabilizing members F are carried by the frame adjacent and on opposite sides of the steering wheel B. The stabilizing members are spaced vertically from the surface upon which the vehicle is riding, but engage the surface when the vehicle tilts to one side preventing such from turning over. An axle upon which the single steerable drive wheel B is carried is mounted on a channel member of a pair of circular angle members G which are in juxtaposition, and have ball bearings carried therebetween for allowing one member to rotate relative to the other in order that the vehicle can be steered during operation. A switching circuit H is interposed between the battery and the motor for sequentially converting the cells of the battery from a parallel connection to a series connection in order to increase the voltage applied to the motor.

The frame A is constructed primarily of steel in the form of angle iron and the like, and is substantially rectangular in shape having a vertical front frame portion 10, the upper end of which is integral with the horizontal main body portion 11 which extends over the front steering wheel, the battery E, and the rear set of wheels. Adjacent the rear of the main body portion 11 is suitable framework 12 upon which the platform on which the operator stands is mounted. A vertical standard 13 extends upwardly from the main body portion of the frame 11 for accommodating the steering wheel 14 and a throttle 15, which is used for controlling the speed of the vehicle.

A fiberglass housing 16 encloses the upper portion of the framework and is bolted thereto by bolts 17. The fiberglass housing has a vertical front wall 18, the upper end of which is integral with a flat horizontal portion 19 which extends across the top of the horizontal main body portion 11 of the frame and is bolted thereto. The housing has opposed sidewalls 20 extending downwardly from the flat horizontal portion 19 which terminate adjacent or slightly below the bottom of the frame. The portion of the housing integral with the rear of the horizontal portion 19 has a recess 21 therein, which permits an operator to stand on a pivotal platform 22 when operating the vehicle. One of the sidewalls 20 also has a hinged panel therein (not shown) which can be readily raised for removing the battery pack from the vehicle in order to substitute another therefor.

The drivable steering wheel B is carried within rectangular-shaped framing which includes the front frame portion 10 and a portion of the horizontal main bottom body 11 from which downwardly extending vertical angle irons 23 are connected adjacent the sidewall of the framework. A pair of opposed channels 24 extend from adjacent the base of the vertical angle irons 23 to the front frame portion 10.

The steerable drive wheel B and the DC motor D are mounted on the circular bearing member G so that they rotate simultaneously therewith. The steerable wheel B has an enlarged sprocket 25, attached thereto, through a bearing 26 so that by rotating the sprocket such, in turn, rotates the wheel B. An axle 27 extends through the wheel B, the bearing 26, and the sprocket so that such can rotate thereon. The ends of the axle 27 extend between opposed vertical braces 28 and are fixed thereto, by nuts 29. The DC motor D is mounted on the upper ends of the vertical braces 28 so as to allow such to rotate with the wheel B. The lower ends of the vertical braces 28 are secured to the vertical flange of a cross angle iron 30 by any suitable means, such as by welding. The cross angle irons 30 are, in turn, bolted between opposed sides of the lower movable portion of a bearing assembly G. A more detailed showing of the bearing assembly G is illustrated in FIGS. 1, 2, 9 and 10. The circular bearing assembly G is constructed of two pieces of circular angle members 31 and 32, respectively. The opposed circular angle members 31 and 32 are in juxtaposition so as to define a circular channel in which ball bearings 33 are positioned for maintaining the two members 31 and 32 apart and for allowing the lower member 32 to rotate relative to the upper member. The upper channel member 31 has a downwardly extending portion 34 which has a locking abutment 35 projecting inwardly adjacent the lower portion of the sidewall thereof. The lower angle member 32 has an upwardly extending portion 36 adjacent its inner perimeter which, in turn, has an inwardly projecting locking abutment 37 projecting from the sidewall thereof, so that when the ball bearings 33 are placed in the circular channel such permits the lower angle member 32 to rotate relative to the upper angle member, and also prevents the angle members from separating. The ball bearings 33 are loaded into the circular channel by means of a hole 38 extending through the upper angle member and communicating with the circular channel. This hole is normally closed by means of a bolt 39. At one point on the lower angle member a portion of the locking abutment 37 is removed so that the ball bearings can be dropped through the hole 38 into the channel. When the nut is returned to position, as shown, such prevents the ball bearings from coming out of the bearing assembly.

As previously mentioned, the angle irons 30 upon which the drive wheel B and the motor D are mounted are, in turn, mounted between opposed sides of the lower angle member 32. The upper angle member is, in turn, bolted to the angle irons 24 which are carried on the side of the frame between the front frame portion 10 and the vertical angle irons 23.

A groove 41 is provided in the outer perimeter of the lower angle member 32 of the bearing assembly G for receiving a cable 42 which is wrapped therearound. Thus, by pulling the cable 42 such, in turn, rotates the lower angle member 32 causing the wheel B to rotate accordingly. Therefore, the vehicle can be readily or easily manipulated in restricted areas by means of the cable 42.

The cable is an endless cable and one side of such extends under a pulley 43 rotatably mounted on the brace 24, over the pulley 44 carried adjacent the top of the frame, under the pulley 45 adjacent the vertical standard 13, through the framework of the standard 13, and is then wrapped around the grooved body portion 46 of the steering wheel so that when such is rotated the cable is taken up on one side and let out on the other. The other side of the cable extends from the steering wheel 14 and is returned to the bearing assembly G via pulleys 45, 44 and 43, which correspond to the pulleys carried on the opposite side of the frame.

The DC motor D may be any suitable conventional electric motor which can be operated by voltages from 6 to 24 volts. The drive shaft 47 extends outwardly from the motor D and has a sprocket 48 mounted thereon. A chain 49 is mounted between the smaller sprocket 48 and the large sprocket 25 so that when the drive shaft 47 of the motor is rotated such, in turn, causes the drive wheel B to be rotated in order to propel the vehicle. It is noted that during the steering operation the motor assembly rotates with the steering wheel B.

The rear end of the vehicle is supported on a pair of wheels C. The wheels C are carried between oppose rear side frame members, each of which includes a brace 50 which is integral with the lower end of the vertical brace 23, and extends under the battery E for supporting such and then turns upwardly as at 51, then rearwardly as at 52, terminating behind the rear wheels C. Suitable vertical side braces 53 and 54 have their lower ends integral with the horizontal rearwardly extending brace 52, and extend upwardly to join the rear end of the horizontal main body brace 11. Braces, such as the cross brace 55, also extend between the opposite side frames connecting such together adding strength and rigidity to the entire frame.

The axle 56 upon which the rear wheels C are carried is, in turn, carried within a pair of opposed brackets 57, each having an elongated slot therein so that the axle can be shifted longitudinally in order to change position of the wheels relative to the frame.

A plurality of spaced downwardly extending flange members 59 are pivotally carried adjacent each elongated slot 58 for locking the axle 56 into position relative to the frame between adjacent flange members. As shown in FIGS. 7 and 8, the upper ends of the flange members 59 are integral with the elongated rod 60 which has its ends journaled in laterally extending brackets 61 so that such can be pivoted from a downwardly extending vertical position where the axle is locked between the flange members 59 to a horizontal position where the axle can be shifted longitudinally within the slot 58.

The mechanism for pivoting the flange members 59 from the vertical position to the horizontal position is illustrated in FIG. 8, and includes a handle 62 which, when depressed, to the dotted line position raises the flange members 59 to the horizontal position. The handle 62 has a horizontal portion 63 which is suitably journaled on the frame (not shown) so that when such is depressed it rotates an arm 64 which has one end pivotally connected to another linking arm 65 which has its free end pivotally connected to still another linking arm 66, which has its free end fixed to the rod 60. A spring 66a is connected between the frame and the lower end of linking arm 65 for maintaining the handle 62 in the raised position, as shown in FIG. 8. The other end of the arm 64 is pivotally connected to a linking arm 67 which has its free end pivotally connected to the linking arm 66 on the other side of the frame, which in turn manipulates the other rod 60. Thus, it can be seen that when the handle 62 is depressed, the arm 64 is rotated in a clockwise direction, and such rotation causes the linking arm 65 to pivot one arm 66 connected to the rod 60 in a clockwise direction raising the flange members 59 on the right-hand side of the frame, as illustrated in FIG. 8, from the full line vertical position to the broken line horizontal position. The rotation of the lower end of the lever arm 64 in a clockwise direction causes the lever arm 66 on the left-hand side of the frame to be rotated in a counterclockwise direction pivoting the flange members 59 on that side of the frame in a clockwise direction to the horizontal position as shown in broken lines. The reason that it is desirable that the rear wheels can be adjusted, is that when there is no load carried on the vehicle and the operator places his weight on the rear of the platform 22, sometimes such will cause the front of the vehicle to be raised off the surface upon which it is riding. Since the front wheel B is the driving wheel, such will immobilize the vehicle. It is also desirable that the rear wheels be able to be shifted forwardly so as to keep the center of gravity near the laterally extending rear wheels in order to add stability to the vehicle and minimize the possibility of such turning over, especially when lightly loaded.

The operator will stand on the pivotal platform 22 while driving the vehicle. When he places his weight to the rear of the platform such causes the braking shoes 68 to be raised off the rear wheels C, allowing the vehicle to move. When he shifts his weight forward or steps off the platform 22, such causes the braking shoes 68 to engage the wheels, thus stopping the vehicle. The platform 22 is pivotally mounted on a cross rod 69 (see FIG. 7), which is carried between the opposed vertical side braces 53. A spring 70 is carried in compression between the horizontal brace 52 and the platform 22 so that when the operator steps from the platform or shifts his weight forward, such causes the platform to tilt forward to the position shown in FIG. 7 where the braking shoes 68 are in engagement with the wheels C.

Each braking shoe 68 is pivotally carried between a pair of spaced lever arms 71, each of which has its lower end pivotally connected to the horizontal brace 52. The upper ends of the braces 71 are pivotally connected to a cross rod 72 which extends between opposed braking shoes 68. A pair of opposed lifting arms 73 extend from opposite sides of the platform 22 upwardly to the rear cross rod 72 for raising and lowering the braking shoes 68 responsive to corresponding movement of the platform 22. The lower end of the lifting arm 73 is pivotally connected to the platform as at 74, and is connected to the cross arm 72 by means of an adjusting bolt 75. By raising and lowering the nuts 76 carried on opposite sides of the rod 72 the amount of pressure exerted by the spring 70 on the wheel C can be varied.

The battery E used to drive the vehicle includes a pair of 12-volt conventional batteries 77, each of which have a connecting strap (not shown), which couples two 6-volt cells or units together to form the 12-volt battery. When used to power the subject vehicle this connecting strap is cut so that, in essence, there are four 6-volt cells, B1 through B4, which make up the battery.

The two batteries are carried within a battery pack which includes a bottom with sidewalls 78 extending upwardly therefrom about halfway up the battery so as to provide a receptacle for holding or retaining the two batteries therein. A handle 79 extends upwardly from opposed side walls 78 over the top of the battery so that the entire battery pack can be lifted from the frame when discharged in order that another fully charged battery can be substituted therefor. It is noted that the battery pack is supported on the brace 50, and is prevented from moving by the braces 23 and 51.

One of the problems encountered in three-wheeled vehicles is that if they are turned sharply while the vehicle is moving at a fast rate of speed, it will tend to tilt or sometimes turn over. While it is desirable for purposes of maneuverability to use a single steering wheel, if such cannot be operated safely, then it is not practical.

In order to minimize the possibility of the vehicle turning over laterally extending stabilizing members F are carried by the frame adjacent and on opposite sides of the steerable drive wheel B. The stabilizing members are spaced vertically from the surface upon which the vehicle is riding, but engage the surface when the vehicle tilts to one side preventing the vehicle from turning over. Such includes a pair of rollers 80 carried on opposite ends of a shaft 81 which is suitably attached to the frame of the vehicle. It is noted that the rollers 80 are spaced above the surface upon which the front wheel B rides so that they only come in engagement with the surface when the vehicle tilts. The edges of the rollers 80 should be beveled so that when such engage the surface they do not produce scratches. In some embodiments, rather than using the disc-shaped rollers, as illustrated, a ball mounted in a socket spaced laterally of the frame and vertically from the surface on which the vehicle is riding can be used.

In the embodiment illustrated in FIGS. 1 and 2, a fiberglass tub-shaped receptacle is carried on the housing 16 for receiving the items that are to be transported by the vehicle. The receptacle has protrusions 83 on the bottom thereof, which fit into corresponding indentations in the top of the housing 16 for holding such in place on the vehicle. The receptacle 82 can be readily removed from on top of the housing and a seat for accommodating a passenger can be substituted therefor. The seat would be carried above the front wheel assembly so that the passengers legs are allowed to extend down over the front of the vehicle and his feet rest on the pivotal platform 84. It is noted that when the platform is not being used, such can be pivoted to a vertical position since it is carried on the rod 85 journaled between the side of the frame.

Figure 5:
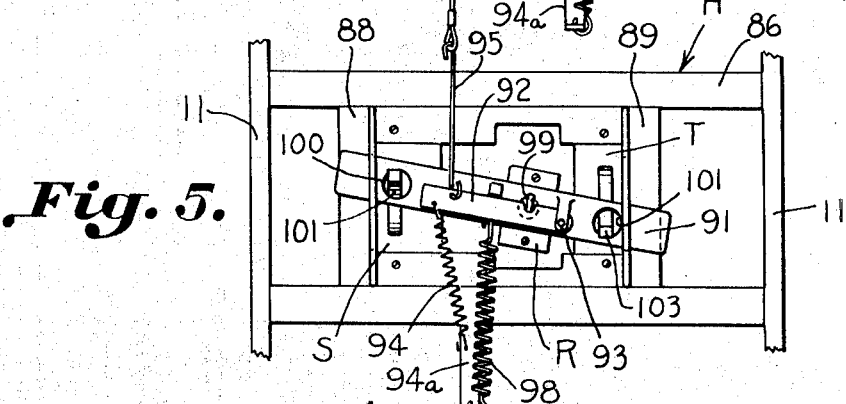
Figure 3:
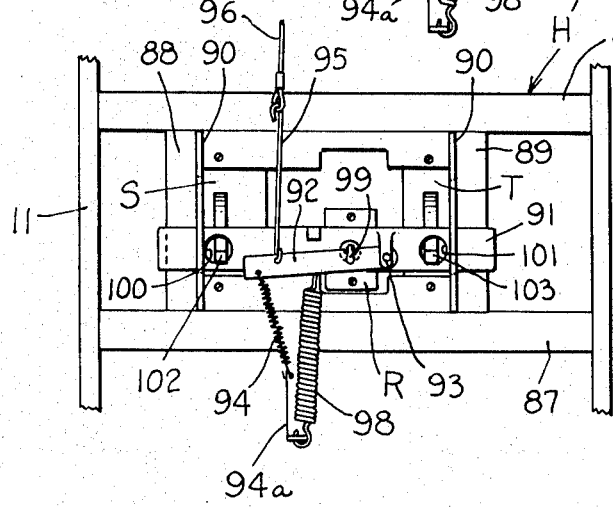

A switching circuit H is interposed between the battery E and the motor D for varying the voltage supplied to the motor responsive to manipulating the throttle lever 15. The switching circuit includes three switches which can be sequentially shifted from a first operating position to second operating position. When the first switch R is closed 6 volts are applied to the DC motor since the wiring arrangement is such that all four of the 6-volt cells are connected in parallel. When the switching circuit is in the position illustrated in FIG. 5 where both switches R and S have been closed, then 12 volts are applied to the DC motor since the cells are connected in groups of a pair of 6-volt cells in parallel and these two groups are then connected in series so that 12 volts are applied to the motor. When all three of the switches R, S and T are in the forward positions, as illustrated in FIG. 6, then all four of the the 6-volt cells are connected in series and 24 volts are applied to the DC motor. Thus, the vehicle has three speeds. A slow speed when the 6 volts are applied to the motor, an intermediate speed when 12 volts are applied to the motor, and a high speed when 24 volts are applied to the motor. The switching circuit and the various positions of such are illustrated in FIGS. 3 through 6 and a schematic diagram of the electrical wiring of the switches is illustrated in FIG. 11. The switching circuit is mounted between a pair of cross braces 86 and 87, which are, in turn, carried between opposite sides of the frame. A pair of opposed laterally extending angle irons 88 and 89 are welded between cross braces 86 and 87 and have their vertical flange 90 extending upwardly. Each of the vertical flanges 90 has an elongated slot therein provided for accommodating the flat bar member 91 and permits such to be moved from a rear position, such as illustrated in FIG. 3, to a forward position, such as illustrated in FIG. 6. Pivotally mounted on the bar member 91 is a lever arm 92. The inner end of the lever arm 92 is pivotally connected to the bar member 91 as at pivot joint 93. The outer end of the lever arm 92 is connected by a spring 94 to a laterally extending bracket 94a. The spring 94 tends to maintain the lever arm 92 in the rear position, such as illustrated in FIG. 3. A hook connecting element 95 has one end connected to the lever arm 92 and the other end connected to a cable 96, which has its free end threaded over pulleys, such as illustrated at 97, and connected to the throttle lever 15. When the throttle lever is pushed forward from the position illustrated in FIG. 2 such causes the cable to pull the lever arm 92 from the rear position illustrated in FIG. 3 to the position illustrated in FIG. 4 against the tension in the spring 94. It is noted that the bar member 91 is also connected by a larger spring 98 to the end of the laterally extending arm 94a. The spring 98 is connected to the bar member 91 offcenter so that when the throttle lever 15 is depressed the cable 96 pulls one side of the bar member forward first, such as illustrated in FIG. 5, until such side reaches the end of the slot and engages such, then upon depressing the throttle lever 15 further, such pulls the other side of the bar member 91 to the forward position, such as illustrated in FIG. 6. When the operator's hand is removed from the throttle 15 the springs 98 and 94 return the bar member 91 and lever arm 92 to the rear position, as illustrated in FIG. 3.

It is noted that the lever arm 92 is notched so as to accommodate the movable switching element 99 of the switch R. The switch 8 is also fixed to the underside of the bar member 91 by any suitable means, such as screws, so that it moves with the bar member. The switching element 99 normally tends to tilt rearwardly except when engaged by the lever arm 92. The bar member 91 has apertures 100 and 101 adjacent the ends thereof, through which the switching elements 102 and 103 of switches S and T, respectively extend. Thus, it can be seen that as the cable 96 is pulled forward a small amount, the switching element 99 is moved to a forward position, then as the cable is moved further the left end of the bar member 91 moves forward shifting the switching element 102 from the the rear position to the forward position until the edge of the bar member 91 engages the end of the slot carried within the vertical flange 90. As the cable 96 is pulled further the right-hand end of the bar member 91 is shifted to the forward position, in turn, shifting switching element 103 from the rear position to the forward position. The switches S and T are held in a fixed position between the cross braces 86 and 87. The spring 98 tends to bias the movable member 91 to a rear position and toward one side.

FIG. 11 is a schematic diagram illustrating the manner in which the vehicle is wired. The three switches R, S and T are illustrated on the left, while the four cells $B_1$, $B_2$, $B_3$ and $B_4$, respectively, of the battery E are illustrated on the right. Each of the cells are 6-volt cells. A reverse switch U is also provided for reversing the polarity of the voltage being supplied to the motor D so that the vehicle can be either driven forward or reverse.

Figure 4:
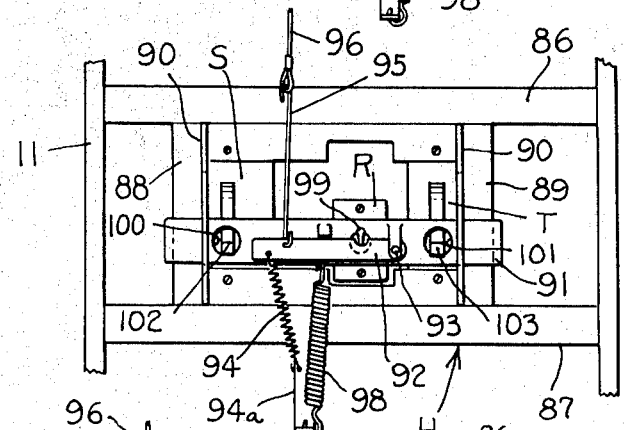

The switch R is a conventional switch having an On-Off position, and when such is in the position illustrated in FIG. 3, such is in the Off position, and when such is in the position as illustrated in FIGS. 4 through 6 such is in the On position. Switch S is a conventional four-pole double-throw switch having 12 terminals $S_1$ through $S_{12}$, respectively, thereon for the purpose of wiring. One suitable four-pole double-throw switch is manufactured by Arrow, Hart and Haggaman of Hartford, Conn. , and has a Model No. 80999. Switch T is a two-pole double-throw switch having 6 terminals thereon, $T_1$ through $T_6$, respectively, and one suitable switch is manufactured by Arrow, Hart and Haggaman of Hartford, Conn., and has a Model No. 81869. The location of the terminals on the switches illustrated in FIG. 11 is as appears when looking from the bottom of the switches. The switching elements 99, 102 and 103 for the switches would move from left to right and back when looking at FIG. 11.

Switch U is a conventional forward and reverse switch. When the switching element (not shown) is moved to the On position, a voltage of one polarity is applied to the motor, and when the switch element is shifted to the reverse position a voltage of the opposite polarity is applied to the motor. When the switching element is in the center the switch is in the Off position. The motor D is wired via leads 104 and 105 to the output of the reversing switch U. One input terminal of the reversing switch U is connnected via lead 106 to terminal $T_6$ on switch T. The other input terminal of the reverse switch is connected via lead 107 to terminal $R_3$ of switch R. Terminal $R_2$ of switch R is a blank terminal, and terminal $R_1$ is connected via lead 108 to terminal $T_2$ of switch T.

Referring now to switch S, it can be seen that terminal $S_1$ is a blank terminal and terminal $S_2$ is connected via lead 109 to terminal $S_9$. Terminal $S_3$ is a blank terminal and terminal $S_4$ is connected by lead 110 to terminal $S_{11}$. Terminal $S_5$ is connected via lead 111 to terminal $T_2$ of switch T. Terminal $S_5$ is also connected via lead 112 to the positive terminal of the battery cell $B_3$. It is also noted that a jumper wire 113 is connected between terminal $S_5$ and $S_9$, and is show in broken lines since such is interally within the switch and is a part of the switching element when purchased. All of the leads shown in the full line have to be supplied when wiring up the switches, whereas, those shown in broken lines are part of the switch when purchased. Terminal $S_6$ is connected via lead 114 to the negative terminal of cell $B_3$. Terminal $S_6$ is also connected to terminal $S_{10}$ through the internal lead 115. Terminal $S_7$ is connected via lead 116 to the positive terminal of cell $B_1$ and connected via lead 117 to terminal $T_3$ of switch T. An internal lead 118 also extends between terminals $S_7$ and $S_{11}$. Terminal $S_8$ is connected via lead 119 to the negative terminal of cell $B_1$. An internal connection, such as via lead 120, extends from terminal $S_8$ to $S_{12}$. Terminal $S_9$ is connected via lead 121 to the positive terminal of cell $B_4$. Terminal $S_{10}$ is connected via lead 122 to the negative terminal of cell $B_4$. Terminal $S_{10}$ is also connected via lead 123 to terminal $T_5$ of switch T. Terminal $S_{11}$ is connected via lead 124 is connected via lead 124 to the positive terminal of cell $B_2$. Terminal $S_{12}$ is connected via lead 125 to the negative terminal of cell $B_2$ and is also connected via lead 126 to terminal $T_6$ of switch T.

Referring to switch T lead 127 extends from terminal $T_3$ to $T_4$ and internal leads 128 and 129 extend between terminals $T_2$ and $T_3$ and $T_5$ and $T_6$, respectively.

A jack 130 is interposed in the leads connecting the switches to the battery so that the battery can be removed and a new one substituted therefor during the recharging. As previously mentioned, the wiring is such that by sequentially operating the switches R, S and T respective voltages of 6, 12 and 24 volts can be applied to the motor D so as to vary the speed of such. When the switching element 99 of switch R is moved from the left-hand side to the right-hand side all of the cells B1 through B4 are connected in parallel thus, 6 volts is applied to the motor D. When the switching element 102 of switch S is moved to the right with the switching element 99 of switch R, then 12 volts is supplied to the motor D since two of the cells are connected in parallel and then the two groups of two cells are connected in series so as to place 12 volts on the motor D.

When the switching elements of all three switches R, S and T are moved to the right then the cells B1 through B4 are connected in series and 24 volts is supplied to the motor D.

In operation the operator stands on the platform 22 and when he shifts his weight to the rear of the platform such causes the braking shoe 68 to be moved out of engagement with the wheel C. He ten pushes forward on the throttle 15 causing a voltage to be applied to the motor D. .When the motor D is energized such, in turn, drives the wheel B through the chain 49 and the large sprocket 25. The vehicle is steered by manipulating the steering wheel 14. If the vehicle is turned too sharply, sometimes it will tend to tilt. However, due to the stabilizing members F such engage the surface in which the vehicle is traveling minimizing the chance of such turning over.

While a preferred embodiment of the invention has been described using specific terms, such description is for illustrative purposes only, and it is to be understood that changes and variations may be made without departing from the spirit or scope of the following claims.

I claim:

1. A self-propelled vehicle capable of riding on rigid surfaces comprising: a frame; a pair of opposed circular angle members in juxtaposition defining a channel therebetween; ball bearings carried within said channel for allowing said angle members to rotate relative to each other about a vertical axis; one of said channel members being fixed to said frame adjacent one end thereof; a steering wheel mounted for rotation on an axle, said axle being carried by said other channel member for rotating therewith relative to said one channel member in order to steer said vehicle; and said other channel member having a groove adjacent the outer perimeter thereof; a cable carried in said groove and wrapped around said other channel member; means for pulling said cable so as to rotate said other channel member in order to steer said vehicle; a pair of wheels carried on the opposite end of said frame from said steering wheel in engagement with said surface upon which the vehicle is traveling for supporting said opposite end of said vehicle; and a motor mounted on said frame in driving engagement with at least one of said wheels so that when such is energized the vehicle is propelled.

2. The vehicle as set forth in claim 1, further comprising: vertically spaced inwardly extending locking abutments carried by said opposed circular angle members on opposite sides of said ball bearing for restricting vertical movement of said angle members relative to each other.

3. The vehicle as set forth in claim 1, further comprising laterally extending stabilizing members carried by said frame adjacent and on opposite sides of said steering wheel, said stabilizing members being spaced vertically from said surface upon which said vehicle is riding but engages said surface when said vehicle tilts to one side preventing said vehicle from turning over.